United States Patent [19]

Kangas et al.

[11] 3,843,585

[45] Oct. 22, 1974

[54] COACERVATION OF ANION-CONTAINING AQUEOUS DISPERSE SYSTEMS WITH AMPHOTERIC POLYELECTROLYTES

[75] Inventors: Donald A. Kangas; W. Robert Neuendorf, both of Midland, Mich.

[73] Assignee: The Dow Chemical Company, Midland, Mich.

[22] Filed: Apr. 28, 1972

[21] Appl. No.: 248,667

[52] U.S. Cl. ............... 260/29.7 N, 260/29.6 RW, 260/29.6 N, 260/29.7 W, 260/29.7 AT, 260/29.7 PT, 260/86.1 N

[51] Int. Cl. .................. C08d 5/02, C08f 47/08

[58] Field of Search ............ 260/29.7 W, 29.6 RW, 260/86.1 N, 29.7 N, 29.7 AT, 29.7 PT, 29.6 N, 29.6 AT

[56] References Cited
UNITED STATES PATENTS

| | | | |
|---|---|---|---|
| 2,754,291 | 7/1956 | Pollack | 260/29.7 W |
| 2,967,175 | 1/1961 | Summers | 260/29.7 W |
| 3,043,822 | 7/1962 | Maeder | 260/86.1 N |
| 3,445,441 | 5/1969 | Rushton | 260/86.1 N |
| 3,470,136 | 9/1969 | McClendon | 260/86.1 N |
| 3,577,554 | 5/1971 | Parrish et al. | 260/29.7 W |
| 3,687,885 | 8/1972 | Abriss et al. | 260/29.7 W |
| 3,689,470 | 9/1972 | Shachat et al. | 260/86.1 N |

OTHER PUBLICATIONS

Kirk–Othmer Ency. of Chem. Tech. (2 ed. Interscience, 1968), Vol. 16; pp. 117–133.

Oosawa Polyelectrolytes (Marcel Dekker, Jan. 1971), Chap. 1, (QD 561 O 6).

Primary Examiner—Morris Liebman
Assistant Examiner—T. DeBenedictis, Sr.
Attorney, Agent, or Firm—Richard G. Waterman; Michael S. Jenkins

[57] ABSTRACT

Fluid, stable compositions containing aqueous disperse systems of anionizable material, e.g., a latex of an organic polymer having carboxylate functionality, and a water-dispersible amphoteric polyelectrolyte, e.g., a copolymer of 2-aminoethyl methacrylate and methacrylic acid, are coacervated by maintaining the pH of the composition at a value below the isoelectric point of the amphoteric polyelectrolyte and a value at which the disperse material contains anions.

12 Claims, No Drawings

COACERVATION OF ANION-CONTAINING AQUEOUS DISPERSE SYSTEMS WITH AMPHOTERIC POLYELECTROLYTES

BACKGROUND OF THE INVENTION

This invention relates to anion-containing aqueous disperse systems containing amphoteric polyelectrolytes as coacervating agents and to a method for accomplishing coacervation of such systems.

It is well known that the particles of an aqueous polymer dispersion have a superficial electrostatic charge, which is particularly appreciable when the dispersion is prepared with the help of an ionic surface active agent. See, for example, Moillet et al., *Surface Activity*, Spon. Ltd., London, 1961 and Schildknecht, *Polymer Processes*, Interscience Pub., 640-8 (1956). Thus, the particles in many known aqueous dispersions of organic and inorganic materials have a surface charge which is positive or negative, depending in part on whether or not the dispersing agent used was cationic or anionic.

Of particular interest in industry are the aqueous dispersions in which the dispersed particles carry an anionic charge. The sign of the charge, if not known, can be readily determined by adding a polycation. If precipitation occurs, the electrostatic charge on the particles is anionic.

It is also well known to dissolve certain polymers bearing anionic groups such as poly(acrylic acid), poly(methacrylic acid) and copolymers of such acids with other ethylenically unsaturated monomers wherein the acid constitutes above about 30 weight percent of the copolymer in water with or without the aid of added base such as sodium hydroxide or added organic solvent such as alcohol, dioxane, acetone and tetrahydrofuran. Other such water-soluble polymers include poly(sodium styrene sulfonate), polymers of sulfo esters of unsaturated carboxylic acids such as poly(sulfoethyl methacrylate), and poly(ethylene sulfonate).

Such aqueous disperse systems, inclusive of dispersions and solutions, are frequently employed in the coating of a variety of substrates, spinning of fibers, impregnation of paper or other bibulous substrates, lamination of sheets, etc. Fluidity of such disperse systems which is conferred by the aqueous medium is generally desired during application. However, once the application is completed, it is desirable to separate the mobilizing medium, i.e., the aqueous phase, from the dispersed material. In most instances, the utility of the dispersed material depends upon its immobility, inertness, or non-redispersibility when deposited. Aqueous dispersions of normally solid, organic polymers, so-called latexes, are most often utilized for these purposes. In other disperse systems, it is often desirable to flocculate or precipitate dispersed solids in order to merely collect dispersed solids and/or to remove such solids from the dispersing aqueous phase.

Several methods are known and are widely used in industry for precipitating colloidal dispersions and solutions and for coagulation of natural and synthetic colloidal systems. Among such methods are heating, cooling, the use of electrical current, violent agitation and the addition of chemicals. Among the latter, the precipitation of latexes, emulsions and other disperse systems by the addition of salts, especially salts of the alum type and/or the addition of acid to change the pH of the colloidal system are known. See, for example, Schildknecht, supra at page 640 and Jirgensons, *Organic Colloidals*, Elsevier Publishing Co., 223-239 (1958). See also U.S. Pat. No. 2,995,512, 3,528,928, 2,832,746 and 3,006,868.

The coacervation methods of the prior art have several disadvantages, particularly in certain specialized applications. For example, in the use of most chemical coagulation or gelation chemical methods of the prior art, coagulation or gelation occurs almost instantaneously after the addition of the chemical coagulating or gelling agent. In some prior art methods, gelation can be delayed for period. See for example Madge, *Latex Foam Rubber*, Interscience Pub., 23-31 (1962). In either instance, an anionically-stabilized, aqueous disperse system compounded with the coagulating or gelling agent can not be stored and subsequently used in stable, fluid form. Furthermore, in prior art gelation of latexes, the rate and uniformity of gel formation is not easily controlled once the gelling agent is added. In most prior art gelation, the fluidity and foaming of the wet froth of the latex is often impaired and even destroyed. Finally, in special reactive latexes such as described in U.S. Pat. No. 3,215,647 to Dunn, conventional coagulating or gelling agents are not effective to form firm wet gels which can be readily handled.

Since it is often necessary, and certainly beneficial, to effect controlled coacervation of aqueous disperse systems without adding chemical coacervating agent at the time coacervation is required, it would be highly desirable to provide stable, fluid, aqueous disperse systems wherein the disperse material contains anionic groups which disperse system can be stored for long periods of time, but which can be coacervated immediately with or without addition of chemical coacervating agent. The latter technique of coacervation is defined herein as latent coacervation.

SUMMARY OF THE INVENTION

In accordance with this invention, coacervation of any aqueous disperse system of an anionizable material (hereinafter referred to as disperse material) is accomplished by (1) combining an inherently water-dispersible, amphoteric polyelectrolyte having an isoelectric point at pH of at least 6 and the aqueous disperse system and (2) maintaining the pH of the resulting combination at a value which is at or below the isoelectric point of the polyelectrolyte and at which the disperse material contains anions. By maintaining the pH of the combined aqueous disperse system and polyelectrolyte is meant holding, raising or lowering the pH by any means to the specified value. It is critical that the disperse material contain anions at said value of pH below the isoelectric point of the polyelectrolyte if coacervation is to occur. The amphoteric polyelectrolyte is present in the aqueous disperse system in an amount effective to coacervate the system at the specified pH. Latent coacervation can be effected by maintaining the pH at the desired value without addition of chemical agent, e.g., by volatilization of base or acid or in situ formation of acid or base. It is therefore understood that any amphoteric polyelectrolyte having an isoelectric point as specified can be suitably employed in practice of this invention to cause latent coacervation of any aqueous disperse system of anionizable material.

The advantages of this invention are recognized (1) in the latent gelation of foamed and non-foamed, anionically-stabilized latexes of water-insoluble organic polymers, (2) in the flocculation of disperse organic or inorganic solids in water, e.g., sewage treatment or flocculation of clay dispersions, (3) in the precipitation of water soluble, anionic copolymers from aqueous solution. The invention is similarly useful in many industrial uses, for instance, in the separation of sludges, precipitation of anionically-stabilized colloidal dispersions of all types, breaking oil-in-water emulsions commonly faced by the petroleum industry, separation of anionically-stabilized dispersions and emulsions used in application to fabrics, paper and textiles. This invention will be particularly useful in the production of dipped goods such as gloves and balloons, adhesives, temporary coatings, and paper coatings and binders or coatings for non-woven fabrics and in the gelation of latex foam in carpet backing.

DETAILED DESCRIPTION OF EMBODIMENTS

For the purposes of this invention, an aqueous disperse system of anionizable disperse material is suitably defined as any aqueous dispersion or solution of any dispersed or solvated material wherein one or more anionizable groups reside in or on the surfaces of each of the dispersed or solvated particles of the material. By an anionizable group is meant any group which will form an anion at some value of pH below the isoelectric point of the amphoteric polyelectrolyte being employed.

In suitable aqueous dispersions maintained at pH at which coacervation is to occur, the dispersed water-insoluble organic or inorganic material exists in the form of small, anionically-charged particles, e.g., from about 0.001 to about 10 microns in diameter, of a solid or liquid which are uniformly dispersed in a continuous aqueous phase. The anionic charge may be the result of anionic groups provided by an anionic surfactant residing on the surface of the particles and/or anionic groups of the disperse material such as in the case of an anionic copolymer, e.g., a styrene/butadiene/acrylic acid copolymer. In addition to water, the aqueous phase may contain a variety of additaments such as electrolytes, surfactants, stabilizers, thickeners, plasticizers, etc.; other polar, water-miscible solvents such as alcohols and the like; dissolved acids or bases and the like.

In suitable aqueous solution, the water-soluble disperse material is solvated as a result of hydration of water-soluble constituents of the molecules of the material and the low molecular weight of the material. It is understood that water-soluble constituents include the essential anionic group or groups and optional groups such as hydroxyl groups, amino groups, amido groups and the like. In the aqueous disperse systems, the anionizable groups are preferably carboxylic acid and salt thereof. It is understood that anionizable groups such as sulfonic acid and salts thereof and others such as sulfites, phosphates, nitrates and the like are also suitable.

The proportion of disperse material to aqueous phase is suitably that proportion which will yield an aqueous dispersion or solution of the disperse material in the conventional sense. Accordingly, the proportion of disperse material to aqueous phase must be small enough so that the aqueous phase is the continuous phase in the case of a dispersion or the solvent in the case of a solution. The proportion of disperse material to aqueous phase must be large enough so that the solubility of the combination of the disperse material and the amphoteric polyelectrolyte in the aqueous disperse system are exceeded at pH below the isoelectric point of the polyelectrolyte. Generally, the coacervate, e.g., a precipitate, coagulum, floc, or gel, will form as result of exceeding the solubility. As a general rule of thumb, the proportion of the two components on a volume basis is from about 2.3:1 to about 0.01:1 of disperse material to aqueous phase.

Exemplary aqueous dispersions which are most advantageously employed in the practice of this invention include anionically-stabilized latexes of water-insoluble acidic polymers such as those in which the polymer contains ionizable carboxylic groups or sulfonate groups; latexes of water-insoluble polymer which are partially or entirely stabilized by anionic surfactant or mixture thereof with non-ionic surfactant; latexes of water-insoluble polymer containing anionizable groups which are partly or almost entirely stabilized by non-ionic surfactants; oil-in-water emulsions stabilized by anionic surfactant, non-ionic surfactant, natural gums, or mixtures thereof; clay dispersions and like dispersions or emulsions wherein at least one anionizable group resides in or on each particle of the disperse material of the emulsion of dispersion.

Of particular interest of the aforementioned aqueous dispersions are the fluid, anionically-stabilized latexes of normally solid, water-insoluble, plastic organic addition polymers wherein the polymeric component is polymerized from monomers such as the monovinylidene carbocyclic aromatic monomers, e.g., styrene, α-methylstyrene, vinyltoluene, ar-chlorostyrene, ar-t-butylstyrene, ar,ar-dichlorostyrene, ar-bromostyrene and vinylnaphthalene; the conjugated diolefins, e.g., butadiene, 2-chloromethyl butadiene, chloroprene, isoprene and 2,3-dimethyl-1,3-butadiene; the aliphatic α-monoolefins, e.g., ethylene, propylene and butene-1; saturated esters of α,β-ethylenically unsaturated carboxylic acids; derivatives of the α,β-ethylenically unsaturated carboxylic acids such as amides and nitriles, e.g., ethyl acrylate, methyl methacrylate, n-butyl acrylate, iso-butyl acrylate, iso-propyl acrylate, 2-hydroxyethyl acrylate, ethyl itaconate, methyl hydrogen maleate, acrylamide, acrylonitrile, fumaronitrile and methacrylonitrile; ethylenically unsaturated esters of non-polymerizable aliphatic and aromatic carboxylic acids such as vinyl acetate, vinyl propionate and vinyl benzoate; ethylenically unsaturated ketones, ethers and halides such as vinyl chloride, vinylidene chloride, methyl vinyl ketone and ethyl vinyl ether, and combinations of two or more thereof. Especially preferred polymers contain predominant amounts, e.g., more than about 50 weight percent, of the foregoing monomers.

In addition to the foregoing monomers, additional reactive comonomers may be employed, e.g., in amounts up to about 20 weight percent based on the latex polymer.

Reactive comonomers suitable for such purpose are described and exemplified in column 2, lines 34–69 of U.S. Pat. No. 3,215,647 to Dunn which patent is incorporated herein in its entirety.

It is also suitable to include small amounts, e.g., up to about 10 weight percent, of special purpose monomers such as crosslinking monomer, e.g., divinyl benzene, trivinyl benzene and the like.

To provide the anionic stabilizing function, the foregoing monomers may be copolymerized with amounts of one or more of the reactive acid comonomers sufficient to render the polymer water-dispersible, but not water-soluble. Usually, the amount is up to about 20 weight percent based on polymer of the acid comonomer, preferably from about 0.5 to about 5 weight percent. Preferred acid comonomers include $\alpha,\beta$-ethylenically unsaturated carboxylic acids, preferably those acids having 3 to 8 carbon atoms such as acrylic, methacrylic, fumaric, maleic, crotonic and itaconic and sulfo esters of such carboxylic acids such as 2-sulfoethyl methacrylate.

Alternatively, the latex is anionically stabilized by the presence of anionic emulsifiers (e.g., surfactants) or mixtures thereof with up to 15 weight percent based on total emulsifier of non-ionic emulsifiers. Any amount of emulsifier which is effective to stabilize the latex is suitable. Preferably the amount is from about 0.1 to about 10 weight percent based on latex polymer.

Exemplary anionic emulsifiers include the water-soluble soaps of soap-forming monocarboxylic acids, e.g., alkali metal salts of linoleic, oleic, stearic, palmitic, myristic, lauric, and capric acids. Additional suitable anionic emulsifiers are the sulfonate and sulfate compounds having the general formulae:

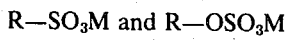

wherein R represents an organic radical having from 9 to 23 carbon atoms and M represents an alkali metal, an ammonium or like group, e.g., dodecyl sodium sulfonate, sodium oleyl sulfate, ammonium dodecylbenzene sulfonate, potassium lauryl sulfate, disodium dodecyldiphenyl oxide disulfonate, dioctyl potassium sulfosuccinate, dihexyl sodium sulfosuccinate and the aryl sulfonate-formaldehyde condensation products. Also suitable anionic emulsifiers are the phosphate esters represented by the general formulae:

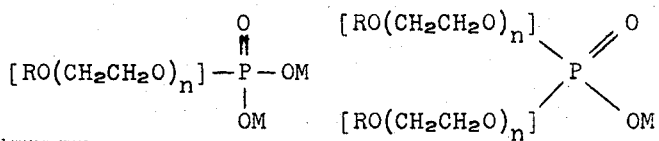

wherein R is hydrogen or an organic radical such as alkyl or hydroxyalkyl, n is the number of moles of ethylene oxide per molecule, usually 1 to 50, and M is a univalent cation such as ammonium or alkali metal cation.

Suitable non-ionic emulsifiers which may be employed in combination with the anionic emulsifiers include the polyoxyethylene agents, e.g., ethylene glycol polyethers, ethylene nonylphenol polyethers, and the like; fatty acid esters of polyhydric alcohols, e.g., propylene glycol fatty acid ester and the like. Other suitable anionic and non-ionic emulsifiers are described in McCutcheon, *Detergents and Emulsifiers*, John W. McCutcheon, Inc. (1963) and Becher, *Emulsions: Theory and Practice*, 2d ed., Reinhold Publishing Corporation, New York 221-225 (1965). It is further understood that the latex may be stabilized by a combination of polymerized anionic comonomer and anionic emulsifier with or without non-ionic emulsifier.

The aqueous dispersions suitably employed in this invention occur naturally or are readily prepared by known dispersion techniques. For example, the aforementioned anionically-stabilized latexes may be prepared by emulsion polymerization methods such as disclosed in Schildknecht, supra, at pages 111-174 or by dispersing mass- or solution-polymerized material by techniques disclosed in U.S. Pat. No. 3,389,109 to Harmon et al., and U.S. Pat. No. 3,644,258 to Moore et al.

Exemplary aqueous solutions include solutions of water soluble synthetic polymers possessing anionic functionality such as water-soluble polymers of $\alpha,\beta$-ethylenically unsaturated carboxylic acids and anhydrides such as poly(acrylic acid), partially hydrolyzed esters of poly(acrylic acid), copolymers of styrene and maleic anhydride, and copolymers of ethylene and maleic anhydride; water-soluble polymers and copolymers of sulfo esters of $\alpha,\beta$-ethylenically unsaturated carboxylic acids, e.g., 2-sulfoethyl acrylate, 2-sulfoethyl methacrylate and others disclosed in U.S. Pat. Nos. 3,024,221 and 3,147,301; water-soluble polymers of monovinylidene aromatic sulfonic acids and salts such as poly(sodium styrenesulfonate); water-soluble polymers of other ethylenically unsaturated sulfonates; and the like. Also included are solutions of an anion-containing materials such as anionic emulsifiers as defined hereinbefore; water-soluble natural gums, carboxylated starches, and the like.

The amphoteric polyelectrolyte has an organic substrate and pendant ionizable cationic and anionic groups. The number of ionizable groups and distribution thereof in the polyelectrolyte is that which is sufficient to render the polyelectrolyte at least inherently water-dispersible and preferably water-soluble. By "inherently water-dispersible" is meant capability of forming a colloidal dispersion in water in absence of chemical dispersing aids such as surfactants, emulsifying agents, etc. The molecular weight of the polyelectrolyte is not critical so long as the polyelectrolyte is inherently water-dispersible. The molar ratio of ionizable cationic groups to ionizable anionic groups of the polyelectrolyte is such that it has an isoelectric point at pH of at least 6, preferably in the pH range from about 7 to about 10. The isoelectric point of the polyelectrolyte is the pH at which the net charge on a molecule of polyelectrolyte is zero. This molar ratio of cationic groups to anionic groups is usually at least about 1:1, preferably in the range from about 2:1 to 10:1.

The ionizable cationic group is suitable any basic group having a pKa in the range from about 4 to about 11 wherein pKa is the negative logarithm of the acidity constant for the basic group. Advantageously, the basic group is a group containing nitrogen, preferably a primary, secondary or tertiary amino group, heterocyclic amino group such as pyridine and pyrrolidine.

The ionizable anionic group is suitably any acidic group having a pKa less than 6, wherein the pKa is the negative logarithm of the acidity constant for the acidic group. The ionizable anionic group is preferably an ionizable carboxyl group, e.g., acid, ester or anhydride. Also suitable are, for example, ionizable sulfonate, sulfite, nitrate or phosphate groups, e.g., acids or metal salts thereof. It is understood that when an ester is employed as the ionizable anionic group that conditions sufficient to hydrolyze the ester must be employed.

Exemplary preferred amphoteric polyelectrolytes include synthetic copolymers of (1) ionizable cationic monomers such as the α,β-ethylenically unsaturated amines, e.g., the aminoalkyl esters of α,β-ethylenically unsaturated carboxylic acids, the aminoalkyl substituted α,β-ethylenically unsaturated amides and imides, vinyl amine, vinyl heterocyclic amines, vinyl benzyl amines and other addition-polymerizable amines having pKa values between about 4 and about 11 and (2) ionizable anionic monomers such as the addition-polymerizable α,β-ethylenically unsaturated carboxylic acids and anhydrides, alkyl esters, acyl halides, amides and nitriles which can be hydrolyzed to carboxylic acids; sulfo esters of α,β-ethylenically unsaturated carboxylic acids; and the addition-polymerizable α,β-ethylenically unsaturated sulfonic acids, phosphonic acids and the like.

Specific examples of especially preferred cationic monomers which are given for purposes of illustration include 2-aminoethyl methacrylate hydrochloride, 2-(N,N-dimethyl)aminoethyl methacrylate hydrochloride, 2-aminoethyl acrylate, N-(N',N'-dimethyl)aminomethyl acrylamide, N-(N',N'-dimethyl), 2-aminoethyl methacrylamide, N-(N',N'-dimethyl)-2-aminoethyl acrylamide, N-(N',N'-dimethyl)-3-aminopropyl methacrylamide, N-(N',N'-dimethyl)-3-aminopropyl maleimide, vinyl amine, vinyl benzyl amine vinyl pyridine, vinyl pyrrolidine, and other weakly basic monomers having pKa values between about 4 and about 11.

Specific examples of especially preferred anionic comonomers which are given for purposes of illustration include acrylic acid, methacrylic acid, itaconic acid, maleic acid, fumaric acid, maleic anhydride, 2-sulfoethyl methacrylate, ethylene sulfonate, sodium styrene sulfonate, sodium styrene phosphonate and other monomers having pKa values less than about 6.

In addition to the foregoing essential ionizable cationic and anionic monomers, it is understood that non-ionic monomers such as styrene, vinyl chloride, vinylidene chloride, ethyl acrylate, butadiene, vinyl acetate, methyl methacrylate, 2-hydroxyethyl acrylate, 2- or 3-hydroxypropyl acrylate, 2-, 3- or 4-hydroxybutyl acrylate and other non-ionic monomers described hereinbefore are optionally employed in concentrations up to about 98 mole percent based on the polyelectrolyte.

The amphoteric polyelectrolytes are suitably prepared by conventional addition polymerization methods which are well known to those skilled in the art. For example, see solution polymerization in water described in W. R. Sorenson et al, *Preparative Methods of Polymer Chemistry*, Interscience Pub., 178–182 (1961).

The amphoteric polyelectrolyte is suitably combined with the aqueous disperse system by any technique suitable for uniformly dispersing chemical additive in aqueous dispersion or solution of dispersed material. For instance, the amphoteric polyelectrolyte, in the pure state or in diluted form such as an aqueous dispersion or solution, is added to the aqueous disperse system and agitated until uniform distribution of the polyelectrolyte is assured. If the polyelectrolyte is added in diluted form, the concentration of polyelectrolyte in the diluent is preferably from bout 1 to about 60 weight percent based on diluent. Alternatively, the aqueous disperse system and polyelectrolyte in pure or diluted form are combined in desired proportions in a continuous manner.

If immediate coacervation is desired upon combination of the polyelectrolyte with the aqueous disperse system, the pH of the system should be lower than the isoelectric point of the polyelectrolyte and above the pH at which the anionizable group or groups of the disperse material dissociate such that the disperse material contains anions.

When immediate coacervation is not desired, the pH of the system should be higher than the pH of isoelectric point of the polyelectrolyte or at pH below that essentially at which the anionizable group or groups of the disperse material dissociate to form anions. Preferably the pH of the aqueous disperse system is at least one point higher than the isoelectric point of the polyelectrolyte to insure stability of disperse system during incorporation. Advantageously, the pH of the disperse system is raised to the desired level by addition of ammonia or another volatile cation.

The amount of polyelectrolyte combined with the aqueous disperse system is an amount sufficient to coacervate the aqueous disperse system at pH which is below the isoelectric point of the polyelectrolyte and which is above the pH at which the anionizable groups of the disperse material begin to dissociate to form anions. Preferably, the amount of polyelectrolyte used is the minimum, or nearly minimum, amount of polyelectrolyte sufficient to coacervate the disperse system at the specified pH. While it is not possible to specify numerically the amounts of polyelectrolyte suitable to effect coacervation in all suitable aqueous disperse systems using all suitable polyelectrolytes, it is found that an amount of polyelectrolyte in the range from about 0.1 to about 5.0 weight percent based on the disperse material is generally sufficient to effect coacervation at the prescribed pH in most suitable systems. It is understood, however, that amounts of polyelectrolyte as high as about 50 weight percent based on the disperse material are suitably employed.

For the purposes of this invention, the term "coacervation" is defined as any process which affects an aqueous disperse system to such an extent that the particles of the disperse material agglomerate in large numbers. Such coacervation is usually evidenced by the conversion of finely divided, colloidally dispersed or solvated material into larger particles which settle rapidly or into gel structures wherein the dispersed or solvated material combines at reasonably rapid rate with the continuous phase or solvent to form a jelly-like product. Accordingly, it is understood that for the purposes of this invention, coacervation is a generic term encompassing such terms as precipitation, gelation, coagulation, flocculation and the like. The foregoing terms such as gelation, coagulation and flocculation are well defined. For example, see Blackley, *High Polymer Latices*, Vol. 1, Palmerton Pub., p. 24–26 (1966). It is further understood that in instances wherein low concentration of the polyelectrolyte is employed, an increase in viscosity is often all that is observed. By latent coacervation is meant coacervation achieved without the addition of further chemical agents to the composition comprising the aqueous disperse system and the amphoteric polyelectrolyte. A further characteristic of coacervation of this invention is that the coacervated disperse material can be redispersed to a disperse system by adjusting pH of the coacervated system to value above the isoelectric point of the polyelectrolyte prior to curing or film formation of the coacervated disperse material.

Coacervation, in the foregoing sense, is suitably effected by maintaining the pH of the combined composition of aqueous disperse system and amphoteric polyelectrolyte at any value at or below the isoelectric point of the polyelectrolyte at which the anionizable groups of the disperse material exist at anions. Maintaining the pH is defined hereinbefore as holding, lowering and raising the pH by any reasonable means. It is understood that the invention is successfully practiced if the number of the total anionizable groups existing an anions is such that one or more anions reside on a predominant number of the particles of the disperse material, i.e., one or more anions should reside on at least about 50 percent of all particles of the disperse material. Preferably, one or more anions reside on each particle of the disperse material. Preferably to effect rapid coagulation, the resultant pH of the disperse system should be about 1 pH unit or more below the isoelectric point of the polyelectrolyte provided that the pH is a value at which the anionizable groups of the disperse material exist as anion. In the practice of this invention, coacervation usually occurs at pH in the range from about 9.5 to about 6.

Preferably, in order to achieve latent coacervation, the pH is lowered to desired value by volatilizing base, e.g., ammonia. Alternatively, pH of the composition is lowered by in situ acid production in the aqueous phase, e.g., decomposition of a persulfate such as alkali metal or ammonium persulfate or hydrolysis of alkali metal salts of silicofluoride. In patent coacervation by volatilization of base, care must be taken to minimize the amount of non-volatile cation of strong base such as alkali metal, quaternary ammonium and others having pKa values above 11 in the disperse system in order that a pH below the isoelectric point of the polyelectrolyte can be achieved. It is understood that latent coacervation may also occur by increasing pH of the combined disperse system and polyelectrolyte from a value below that at which the anionizable groups dissociate to form anions to a pH value at which such dissociation occurs. Such increasing of pH may be carried out by volatilization of acid or by in situ formation of base.

While latent coacervation is preferred in many embodiments of this invention, it is understood that maintaining pH in desired range can be suitably accomplished by addition of acid such as acetic acid or by hydrolysis of an acid anhydride, ester, or amide or sodium silicofluoride which may be added to the aqueous disperse system or by any other method which is effective to lower pH of an aqueous system to a value at or below the pH of the isoelectric point of the polyelectrolyte. Maintaining of pH at desired value can also be accomplished by adding base in order to raise pH until the anionizable groups of the disperse material exist in anionic form. In order to achieve the desired coagulation by maintaining pH at the desired value, it is only critical that an appreciable number of the cationic moieties of the polyelectrolyte remain free to interact with the anions contained by the disperse material.

It is understood that additional ingredients commonly employed in conventional anionically-stabilized, aqueous dispersions and aqueous solutions of organic materials are suitably employed in the compositions of this invention. Such additional ingredients include fillers, thickeners, stabilizers, surface active agents, vulcanizing agents, fire retardant additives, coagulating or gelling agents, coreactive material as described in U.S. Pat. No. 3,215,647 to Dunn, and the like. It is understood that the additional ingredients such as fillers which are generally inert in that they do not bear significant anionic charge, i.e., do not contain anions or anionizable groups, are not considered as part of the disperse material in the practice of this invention. Therefore, for example, fillers may be employed in concentrations up to about 20 weight parts of filler to 1 weight part of disperse material.

The following examples are given to illustrate the preferred embodiments of the invention and should not be construed as limiting its scope. In the examples, all parts and percentages are by weight unless otherwise indicated.

EXAMPLE 1

A. Preparation of Amphoteric Polyelectrolyte

A 2-liter round bottom flask equipped with a stirrer, reflux condenser, thermometer and a nitrogen gas sparging tube is immersed in a water bath maintained at 50°C. A 1,500-g portion of a 2-aminoethyl methacrylate-hydrochloride (2-AEM.HCl) solution, 12 g methacrylic acid and 3 g thiourea are charged to the flask and mixed. The 2-AEM.HCl solution contains 22.1 percent 2-AEM.HCl, 15.3 percent N-(2-aminoethyl)-2-aminoethyl methacrylate-2HCl[N-(2-AE)-2-AEM.2HCl], 0.92 percent 2-hydroxyethyl methacrylamide, 2.1 percent methacrylic acid and 0.020 percent copper (II) sulfate dissolved in water.

The flask is purged with nitrogen for 15 minutes and 18 ml of 30 percent hydrogen peroxide is added with stirring. The temperature of the resulting reaction recipe is increased to 70°C within a period of 2 minutes and then allowed to cool to 50°C. The reaction recipe is then stirred for 3 hours at 50°C with nitrogen gas bubbling through the solution. Conversion of monomer to polymer is essentially complete.

The resulting polymeric material is recovered as a 25 percent solution having a Brookfield viscosity (No. 2 spindle at 60 rpm) of 230 centipoises at 25°C. The polymeric material is analyzed and is found to contain 2.24 milliequivalents of amino groups per gram of material (meq/g) attached to the polymer backbone and 0.81 meq/g of carboxylic acid groups also attached to the polymer backbone. A random terpolymer of about 55 percent 2-AEM.HCl, 5 percent methacrylic acid, 37.5 percent N-(2-AE)-2-AEM.2HCl and 2.5 percent 2-hydroxyethyl methacrylamide having isoelectric point at pH of 8.8 is confirmed. The active concentration of amino calculated as 2-AEM is 29 percent.

In a manner similar to the foregoing procedure several additional 2-AEM.HCl, copolymers are prepared. The properties of these copolyers and the aforementioned copolymer (Sample No. 1) are listed in Table I.

TABLE I

| Sample No. | Amino(1), meq/g | Carboxylic Acid(2) meq/g | (1): (2), meq | pH At The Isoelectric Point(3) | 2-AEM wt% |
|---|---|---|---|---|---|
| 1 | 2.24 | 0.81 | 2.7 | 8.8 | 29.0 |
| 2 | 1.34 | 1.24 | 1.1 | 8.2 | 17.3 |
| 3 | 2.26 | 0.90 | 2.5 | 8.7 | 29.2 |
| 4 | 2.03 | 0.64 | 3.2 | 9.0 | 26.2 |
| 5 | 2.18 | 0.62 | 3.5 | 9.5 | 28.1 |

TABLE I-Continued

| Sample No. | Amino(1), meq/g | Carboxylic Acid(2) meq/g | (1): (2), meq | pH At The Isoelectric Point(3) | 2-AEM wt% |
|---|---|---|---|---|---|

(1) Amino groups attached to the polymeric backbond determined by titration with KOH in a streaming current detector. Streaming current detector is described by Gerdes, W. F., 12th National ISA Analysis Instrumentation Symposium, Houston, Texas, May 11-13, 1966. Reported as milliequivalents of amino per gram of polymer.
(2) Carboxylic acid attached to the polymeric backbone determined by titration with KOH in a streaming current detector. Reported as milliequivalents of carboxylic acid per gram of polymer.
(3) Isoelectric Point as determined by titrating with KOH in a streaming current detector containing a pH electrode to simultaneously determine zero point of charge and pH.

B. Coagulation of Anionically-Stabilized Aqueous Disperse Systems

A latex composition is prepared by adjusting the pH of the latex from 10.0 to 10.8 with ammonium hydroxide and then adding other ingredients to form composition set forth in Table II.

TABLE II

| Ingredients | Dry Wt. parts | Wet Wt. parts |
|---|---|---|
| Latex | 100.0 | 170.0 |
|   Styrene 42% | | |
|   Butadiene 56% | | |
|   Acrylic Acid 2% | | |
| Silicone Oil, 100 centistokes | 1.0 | 1.0 |
| Sodium Lauryl sulfate | 1.5 | 5.0 |
| Aqueous emulsion of paraffin wax (melting point 125°-130°F) | 5.0 | 10.0 |
| Ground limestone, No. 10 white | 150.0 | 150.0 |
| Methyl cellulose, 4000 centipoises | 0.2 | 8.0 |
| Melamine-formaldehyde resin* | 5.0 | 6.2 |

*Partially methylated melamine-formaldehyde condensate in the physical form of a clear viscous syrup at a concentration of 80 weight percent of active ingredients. The syrup has a density of 10 lbs/gal, a pH of 8.5-9 and is soluble in water in all proportions.

The latex composition is divided into several portions and to each portion if added, with continuous stirring, 2.5 percent based on latex dry weight of one of the aforementioned 2-AEM.HCl copolymers. (Sample Nos. 2-5).

The resulting mixture is mechanically foamed in a planetary mixer. The aerated froth is cast at a ⅜-inch thickness in an open mold having a polytetrafluoroethylene coated fiber glass screen as its bottom surface. The foam is heated by an infrared heating means for 30 seconds to set the surface and is then placed in a 290°F circulating air oven to volatize ammonia gas. At 2 minute intervals, the interior of the drying foam is inspected by removing a small piece of foam to a depth of 1 inch into the edge of the foam. Subsequently, the completely cured foam is inspected at the locations where the foam has been disrupted at the 2 minute intervals. These observations are used as a basis for rating the internal strength (reported in Table III as Gel Rating) of the foam.

For the purposes of comparison, a sample ($C_1$) of the latex composition containing no 2-AEM.HCl copolymer is treated in the foregoing manner and observed as indicated.

The results of the foregoing observations are recorded in Table III.

TABLE III

| Sample No. | Polyelectrolyte Sample No.(1) | Isoelectric Point(2) | Gel Rating(3) 2 min. | 4 min. | 6 min. | 8 min. | pH at Gelation |
|---|---|---|---|---|---|---|---|
| 2 | 2 | 8.2 | 1 | 1 | 2 | 3 | 6.2 |
| 3 | 3 | 8.7 | 2 | 4 | 5 | 5 | 8.0 |
| 4 | 4 | 9.0 | 2 | 5 | 5 | 5 | 8.2 |
| 5 | 5 | 9.5 | 4 | 5 | 5 | 5 | 8.7 |
| $C_1$* | None | — | 1 | 1 | 1 | 1 | — |

*Not an example of the invention.
(1) Polyelectrolyte is described in Table I according to Sample No.
(2) Same as (3) in Table I.
(3) Gel Rating is an indication of speed of gelation by determination of gel strength at timed intervals. A numerical rating system is used in which a rating 1 indicates a foam with a fluidity (strength) essentially the same as when it is cast, i.e., sufficient fluidity to heal over to a smooth surface on subsequent drying and curing. A rating of 5 indicates an interior foam structure which can be torn away leaving a coarse, broken surface which shows no healing over on subsequent heating. Intermediate ratings are used to indicate intermediate degrees of gel structure formation in the froth.

EXAMPLE 2

The polyelectrolyte of Sample No. 4 of Example 1 and the latex composition of Ecample 1 are combined in varying proportions and are subsequently foamed and gelled in the manner described in Example 1.

The resulting gel structures are observed at various time intervals and are rated as set forth in Table IV.

TABLE IV

| Sample No. | Polyelectrolyte Concentration(1), Wt% | Gel Rating(2) 2 min. | 4 min. | 6 min. | 8 min. |
|---|---|---|---|---|---|
| 1 | 0.75 | 1 | 2 | 3 | 4 |
| 2 | 1.0 | 2 | 4 | 5 | 5 |
| 3 | 1.2 | 3 | 4 | 5 | 5 |
| 4 | 1.5 | 4 | 5 | 5 | 5 |

(1) Weight percent based on latex polymer.
(2) Same as (3) in Table II.

EXAMPLE 3

Using the procedure of Example 1, the latexes of Table V are adjusted to pH of about 10.8 and are each combined with the other ingredients given in Table II in the proportions set forth therein to form the desired latex compositions.

TABLE V

| | Dry Wt. | Wet Wt. |
|---|---|---|
| Latex No. 1 | 100 | 170 |
|   Styrene 41% | | |

TABLE V-Continued

| | Dry Wt. | Wet Wt. |
|---|---|---|
| Butadiene 56% 2-Hydroxyethyl Acrylate 3% | | |
| Latex No. 2 Styrene 42% Butadiene 56% Itaconic Acid 1.1% 2-hydroxyethyl acrylate 1.0% | 100 | 170 |

Using the procedure of Example 1, the polyelectrolytes designated Sample Nos. 4 and 5 in Table I are incorporated in varying amounts into separate portions of Latex Nos. 1 and 2.

The resulting compositions are foamed and gelled in accordance with the procedure of Example 1. The resulting gel structures are observed at various time intervals and are rated as set forth in Table VI.

For purposes of comparison, Samples ($C_1$ and $C_2$) of Latex Compositions Nos. 1 and 2 containing no polyelectrolyte are foamed and gelled by the foregoing procedure. The gel ratings for these samples are also shown in Table VI.

TABLE VI

| Sample No. | Latex Composition No. | Polyelectrolyte Sample No.(1) | Wt%(2) | Gel Rating(3) 2min | 4min | 6min | 8min |
|---|---|---|---|---|---|---|---|
| 1 | 1 | 5 | 0.75 | 1 | 3 | 4 | 4 |
| 2 | 1 | 4 | 1.0 | 4 | 5 | 5 | 5 |
| 3 | 1 | 4 | 0.75 | 4 | 5 | 5 | 5 |
| $C_1$* | 1 | None | | 1 | 1 | 1 | 1 |
| 4 | 2 | 5 | 1.0 | 4 | 5 | 5 | 5 |
| 5 | 2 | 4 | 1.5 | 4 | 5 | 5 | 5 |
| 6 | 2 | 4 | 1.0 | 4 | 5 | 5 | 5 |
| $C_2$* | 2 | None | | 1 | 1 | 1 | 1 |

*Not an example of the invention.
(1) Same as (1) in Table III.
(2) Same as (1) in Table IV.
(3) Same as (3) in Table III.

Since Latex Composition No. 1 is stabilized by anionic surfactant instead of ionic groups in the latex polymer, Sample Nos. 1–3 establish that the amphoteric polyelectrolyte is a suitable latent coagulating agent for anionic surfactant stabilized latexes.

EXAMPLE 4

Preparation of Amphoteric Polyelectrolyte

The following ingredients are mixed in a 4-oz. round bottle which contained a magnetic stirring bar:
48 ml deionized water
27 ml 5 N HCl
21.1 g 2-(N,N-dimethyl)aminoethyl methacrylate
3.85 g methacrylic acid (glacial)
0.2 g thiourea The magnetic stirring bar is removed and the bottle placed in a water bath maintained at 50°C. After purging with nitrogen gas for 10 minutes, 1.2 ml of 30 percent $H_2O_2$ solution is added. The temperature of the solution increases to 54°C in about 10 minutes. The bottle and reaction recipe rest in the bath for 2½ hours with $N_2$ bubbling through the recipe.

The resulting polymer is recovered and is found to have the following properties:
Isoelectric point — 8.8
Amino groups — 1.21 meq/g
Carboxylic acid groups — 0.59 meq/g
2-(N,N-dimethyl)aminoethyl methacrylate (calculated) — 21.2 percent The polymer is confirmed to be 2-(N,N-dimethyl)aminoethyl methacrylate/methacrylic acid copolymer.

Precipitation of Polymer from Solution

The pH of the foregoing polyelectrolyte is increased to 10.5 by adding 1.0 N sodium hydroxide. A 1-part portion of the aqueous polyelectrolyte is mixed with 10 parts of 1 percent aqueous solution of a polymer of sodium acrylate, e.g., a polymer sold under the trademark, Alcogum 5950, at pH of 10.5. No precipitate is formed. A precipitate is formed by adding 1 N HCl to the polymer solution until pH of 8 is reached.

A second portion of the polymer solution containing no polyelectrolyte is similarly treated by adding 1 N HCl to the solution. No precipitate is formed until the pH of the solution is below 4.

EXAMPLE 5

The following ingredients are mixed in a 4-oz. round bottle which contains a magnetic stirring bar:
44 ml deionized water
31 ml 5 N HCl
20.55 g distilled vinylbenzyl amine
4.45 g methacrylic acid (glacial)
0.2 g thiourea The magnetic stirring bar is removed and the bottle is placed in a water bath heated to 50°C. After 10 minutes purging with $N_2$, 1.2 ml of 30 percent $H_2O_2$ is added. The temperature of the reaction recipe increases to 52°C. The recipe rests in the bath at 50°C with $N_2$ bubbling through it for 7½ hours.

The resulting polymer is recovered and is found to have the following properties:
Isoelectric point — 9.4
Amino groups — 1.5 meg/g
Carboxylic Acid groups — 0.55 meg/g
Vinylbenzyl amine — 20.1 percent.

The polymer is confirmed to be a vinylbenzyl amine/methacrylic acid copolymer having an isoelectric point of 9.4.

Precipitation of Polymer from Solution

The pH of the foregoing polyelectrolyte is increased to 10.5 by adding 1.0 N NaOH. A 1-part portion of the aqueous polyelectrolyte is mixed with 10 parts of 1 percent aqueous solution of a polymer of sodium acrylate at pH of 10.5. No precipitate is formed. A precipitate is formed by adding 1 N HCl to the polymer solution until pH of about 8.5 is reached.

EXAMPLE 6

To an aqueous solution of 2-AEM.HCl/methacrylic acid copolymer (10:1 on molar basis) having an isoelectric point of 10 is added 1 N NaOH to increase the pH to > 10.

The resulting polyelectrolyte solution is mixed with a 50 percent solids latex of styrene/butadiene/acrylic acid terpolymer (42/56/2) at pH > 10 without causing coagulation or thickening. The mixture is gelled by adding acetic acid.

Another solution of the same copolymer to which has been added ammonia to pH > 10 is mixed with ammonia-neutralized styrene/butadiene/acrylic acid (42/56/2) without forming coagulum or significantly thickening the latex. The latex does gel after a brief time of heating on a steam bath as a result of volatilizing ammonia to lower pH of the latex to a value less than 10.

EXAMPLE 7

A mineral oil emulsion which comprises the following ingredients:

| Ingredients | Dry Wt., parts | Wet Wt., parts |
|---|---|---|
| Mineral Oil | 200 | 200 |
| Sodium lauryl sulfate | 13.7 | 45.7 |
| Water | — | 87 | is prepared by adding water slowly with mixing to the oil and emulsifier.

To a 50-g portion of the resulting emulsion is added dilute aqueous ammonia to adjust pH of the emulsion to 10.8. To this portion is added with stirring an aqueous solution of the 2-AEM.HCl/methacrylic acid copolymer (0.92 g on solids basis). The pH of the solution of copolymer is 10. The copolymer has an isoelectric point at pH of 9 and contains 21 percent of 2-aminoethyl methacrylate. Dilute HCl is added to the resulting composition until pH of 8.0 is reached. The composition coagulates to form a white, curd-like layer with water phase forming the bottom layer. Upon addition of dilute aqueous ammonia to the coagulated system until pH of 10.8 is attained, the white, curd-like layer is redispersed to a stable emulsion.

For purposes of comparison, to another 50-g portion of the mineral oil emulsion containing none of the 2-AEM.HCl/methacrylic acid copolymer is added dilute aqueous ammonia to adjust pH to 10.8 and dilute HCl to lower pH to 7.0. The emulsion exhibits no evidence of coagulation during the foregoing operation.

EXAMPLE 8

An anionically stabilized clay dispersion which comprises the following ingredients:

| Ingredients | Dry Wt., parts | Wet Wt., parts |
|---|---|---|
| Aluminum silicate clay (mean particle size of 4.8 micron) | 500 | 500 |
| Sodium salt of low molecular weight poly(acrylic acid) | 5 | 20 |
| Water | — | 313 | is prepared by blending the ingredients in a high shear mixing device and then adding dilute aqueous ammonia to increase pH of the dispersion to 10.2.

To a 167-g portion of the foregoing dispersion is added with stirring an aqueous solution of the 2-AEM.HCl/methacrylic acid copolymer used in Example 7 (1.36 g on a solids basis). The pH of the solution of copolymer is 9.8. Dilute HCl is added to the dispersion until a pH of 6.0 is attained. The dispersion gels to form an extremely viscous curd-like mass.

Another portion of the dispersion containing none of the 2-AEM.HCl/methacrylic acid copolymer is similarly treated with dilute aqueous ammonia and dilute HCl. No increase in viscosity is observed. When this portion and an untreated portion of the clay dispersion are allowed to stand overnight, the clay particles of both portions settle slowly to the bottom.

What is claimed is:

1. A composition comprising an aqueous disperse system of an anionizable material selected from the group consisting of anionically-stabilized latex of a water-insoluble acidic polymer, latex of water-insoluble polymer which is at least partially stabilized by anionic surfactant or mixture thereof with non-ionic surfactant, latex of water-insoluble polymer containing anionizable groups which is at least partially stabilized by non-ionic surfactant and an amount of an inherently water-dispersible amphoteric polyelectrolyte effective to irreversibly gel the system at a value of pH which is at or below the isoelectric point of the polyelectrolyte and at which value the anionizable material contains anions, said polyelectrolyte having an isoelectric point at pH of at least 6 and containing ionizable cationic groups having a pKa in the range from about 4 to about 11 and ionizable anionic groups having a pKa less than about 6, said polyelectrolyte having a molar ratio of ionizable cationic groups to ionizable anionic groups of at least 1:1.

2. The composition according to claim 1 wherein the polyelectrolyte has an isoelectric point at pH in the range from about 7 to about 10.

3. The composition according to claim 2 wherein the polyelectrolyte has a molar ratio of ionizable cationic groups to ionizable anionic groups in the range from about 2:1 to 10:1.

4. The composition according to claim 3 wherein the cationic groups are amino groups and the anionic groups are carboxyl groups.

5. The composition according to claim 4 wherein the polyelectrolyte is a copolymer of an aminoalkyl ester of α,β-ethylenically unsaturated carboxylic acid and α,β-ethylenically unsaturated carboxylic acid.

6. The composition according to claim 5 wherein the aqueous disperse system comprises an anionically stabilized latex of a normally solid, water-insoluble, plastic organic addition polymer.

7. The composition according to claim 6 wherein the addition polymer of the latex is a polymer of monovinylidene aromatic carbocyclic monomer, conjugated diene and α,β-ethylenically unsaturated carboxylic acid.

8. A process for gelling an aqueous disperse system of an anionizable disperse material selected from the group consisting of anionically-stabilized latex of a water-insoluble acidic polymer, latex of water-insoluble polymer which is at least partially stabilized by anionic surfactant or mixture thereof with non-ionic surfactant, latex of water-insoluble polymer containing anionizable groups which is at least partially stabilized by non-ionic surfactant which comprises (1) combining the disperse system and the amphoteric polyelectrolyte of claim 1 in an amount effective to to irreversibly gel the disperse system at a value of pH which is at or below the isoelectric point of the polyelectrolyte and at which value the anionizable material contains anions and (2) maintaining the pH of the combined disperse system and polyelectrolyte at said value.

9. A process according to claim 8 for latent gelation of the aqueous disperse system wherein the disperse system and polyelectrolyte are combined at pH above the isoelectric point of the polyelectrolyte and the pH of the combined disperse system and polyelectrolyte is lowered to a pH below the isoelectric point of the polyelectrolyte without the addition of chemical agent.

10. The process according to claim 9 wherein the pH is lowered by volatilization of base.

11. The composition of claim 1 in the form of an irreversible gel.

12. The composition of claim 11 which is foamed.

* * * * *

PO-1050
(5/69)

UNITED STATES PATENT OFFICE
CERTIFICATE OF CORRECTION

Patent No. 3,843,585     Dated October 22, 1974

Inventor(s) Donald A. Kangas, W. Robert Neuendorf

It is certified that error appears in the above-identified patent and that said Letters Patent are hereby corrected as shown below:

Column 4, line 28, second occurrence, the word "of" should be --or--.

Column 7, line 64, the word "bout" should be --about--.

Column 9, line 8, the word "at" should be --as--.

Column 9, line 9, the word "and" should be --or--.

Column 9, line 32, the word "patent" should be --latent--.

Column 10, line 56, the word "copolyers" should --copolymers--.

Column 12, line 39, the word "Ecample" should be --Example--.

Column 14, line 37, the word "meg/g" should be --meq/g--.

Column 14, line 38, the word "meg/g" should be --meq/g--.

Signed and Sealed this fourteenth Day of October 1975

[SEAL]

Attest:

RUTH C. MASON
Attesting Officer

C. MARSHALL DANN
Commissioner of Patents and Trademarks